(12) United States Patent
Takahashi et al.

(10) Patent No.: US 6,819,828 B2
(45) Date of Patent: Nov. 16, 2004

(54) METHOD AND DEVICE FOR OPTICAL FIBER TRANSMISSION

(75) Inventors: Tsukasa Takahashi, Sapporo (JP); Toshihiro Ohtani, Sapporo (JP); Yoichi Oikawa, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 139 days.

(21) Appl. No.: 09/962,111

(22) Filed: Sep. 26, 2001

(65) Prior Publication Data

US 2003/0026527 A1 Feb. 6, 2003

(30) Foreign Application Priority Data

May 24, 2001 (JP) ........................................ 2001-156023

(51) Int. Cl.[7] .............................. G02B 6/28; G02B 6/26; G02B 6/42
(52) U.S. Cl. .......................................... 385/24; 385/48
(58) Field of Search .............................. 385/24, 39, 48

(56) References Cited

U.S. PATENT DOCUMENTS 5,933,552 A * 8/1999 Fukushima et al. ........... 385/24
5,995,259 A * 11/1999 Meli et al. ..................... 398/92
2003/0099425 A1 * 5/2003 Grubb et al. .................. 385/14

FOREIGN PATENT DOCUMENTS

| JP | 08171109 A | * | 7/1996 |
| JP | 11008590 A | * | 1/1999 |
| JP | 2000-19068 A | * | 1/2000 |

* cited by examiner

Primary Examiner—Chandrika Prasad
(74) Attorney, Agent, or Firm—Staas & Halsey LLP

(57) ABSTRACT

Disclosed herein is a method including the steps of wavelength division multiplexing a plurality of optical signals having different wavelengths to obtain resultant WDM signal light; transmitting the WDM signal light by an optical fiber transmission line; supplying reference light having a predetermined wavelength to the optical fiber transmission line; generating four-wave mixing in the optical fiber transmission line by the interaction of the WDM signal light and the reference light; detecting the power of light generated as the result of the four-wave mixing; and controlling the power of the WDM signal light to be supplied to the optical fiber transmission line according to the power detected. According to this method, the effect of four-wave mixing can be suppressed.

32 Claims, 12 Drawing Sheets

△fab : DIFFERENCE BETWEEN FREQUENCIES a AND b

METHOD AND DEVICE FOR OPTICAL FIBER TRANSMISSION

BACKGROUND OF THE INVENTION

1. Field of the Invention

The present invention relates to a method and device for optical fiber transmission.

2. Description of the Related Art

In recent years, a manufacturing technique and using technique for a low-loss (e.g., 0.2 dB/km) optical fiber have been established, and an optical communication system using the optical fiber as a transmission line has been put to practical use. Further, to compensate for losses in the optical fiber and thereby allow long-haul transmission, the use of an optical amplifier for amplifying signal light has been proposed or put to practical use.

An optical amplifier known in the art includes an optical amplifying medium to which signal light to be amplified is supplied and means for pumping the optical amplifying medium so that the optical amplifying medium provides a gain band including the wavelength of the signal light.

For example, an erbium doped fiber amplifier (EDFA) includes an erbium doped fiber (EDF) as the optical amplifying medium and a pumping source for supplying pump light having a predetermined wavelength to the EDF. By preliminarily setting the wavelength of the pump light within a 0.98 $\mu$m band or a 1.48 $\mu$m band, a gain band including a 1.55 $\mu$m band can be obtained.

Further, another type optical amplifier having a semiconductor chip as the optical amplifying medium is also known. In this case, the pumping is performed by injecting an electric current into the semiconductor chip.

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain WDM signal light, which is output to an optical fiber transmission line. On the receiving side, the WDM signal light received is separated into individual optical signals by an optical demultiplexer, and transmitted data is reproduced according to each optical signal. Accordingly, by applying WDM, the transmission capacity in a single optical fiber can be increased according to the number of WDM channels.

When two waves having different frequencies are superimposed on each other, beat is generated at a frequency corresponding to the difference between these frequencies of the two waves. For example, when two lightwaves having different frequencies propagate in an optical fiber, beat having a difference frequency is generated to oscillate the material state of the optical fiber. As a result, this oscillation has an effect on the propagated light to cause scattering of a part of the propagated light. The scattered light also propagates in the optical fiber. The frequency of the scattered light is shifted from the frequency of the original propagated light by the frequency of the oscillation of the fiber material state. This property is the same as that the propagated light is modulated to generate modulated sidebands.

The frequency of the oscillation of the fiber material state is the same as the frequency of the beat, or the difference frequency in WDM signal light. Therefore, the frequency of the scattered light is equal to (the frequency of the propagated light)±(the difference frequency). Thus, the two waves at different frequencies causing the beat and the scattered wave from the propagated light produce a new, or fourth wave having another frequency (Four-Wave Mixing: FWM).

The condition for generation of the four-wave mixing is determined mainly by the powers of optical signals, the frequency (wavelength) spacings of optical signals, and the dispersion of the optical fiber. In the case that the powers are large, the frequency spacings are narrow, and the fiber dispersion is small, the four-wave mixing is easily generated.

When the frequencies of optical signals in WDM signal light are equally spaced, the frequencies of light generated by four-wave mixing are superimposed on the frequency of the transmitted optical signals. In this case, the light generated by four-wave mixing acts as noise to the optical signals, thus degrading the quality of the optical signals. The degree of this degradation depends on the optical signal power per channel, the number of WDM channels, the frequency spacing, the transmission distance, the kind of the optical fiber, and the like.

In an existing system, the generation of four-wave mixing is suppressed by lowering optical output power or using an optical fiber having a large dispersion. However, lowering the optical output power causes a corresponding reduction in system gain, resulting in a short transmission distance. Further, using an optical fiber having a large dispersion causes a difficulty of long-haul transmission due to the effect of dispersion.

Measures for suppressing the effect of four-wave mixing on the transmitted optical signals as allowing the generation of four-wave mixing include arranging the frequencies of the optical signals at unequal spacings or shifting the wavelengths of the optical signals to wavelengths longer than the zero-dispersion wavelength of the optical fiber to provide dispersion. However, when the frequency spacings are made unequal, the number of channels that can be provided in a limited band is reduced, causing a limitation to expansion of the transmission capacity. Further, when the wavelengths of optical signals are shifted to longer wavelengths with respect to the zero-dispersion wavelength of the fiber to provide dispersion, the transmission distance is reduced by the effect of dispersion.

SUMMARY OF THE INVENTION

It is therefore an object of the present invention to provide a method and device for optical fiber transmission which can suppress the effect of four-wave mixing.

In accordance with an aspect of the present invention, there is provided a method comprising the steps of wavelength division multiplexing a plurality of optical signals having different wavelengths to obtain resultant WDM signal light; transmitting the WDM signal light by an optical fiber transmission line; supplying reference light having a predetermined wavelength to the optical fiber transmission line; generating four-wave mixing in the optical fiber transmission line by the interaction of the WDM signal light and the reference light; detecting the power of light generated as the result of the four-wave mixing; and controlling the power of the WDM signal light to be supplied to the optical fiber transmission line according to the power detected.

In accordance with another aspect of the present invention, there is provided a device comprising an optical fiber transmission line; means for supplying WDM signal light obtained by wavelength division multiplexing a plurality of optical signals having different wavelengths, to the optical fiber transmission line; a light source for supplying reference light having a predetermined wavelength to the optical fiber transmission line; a power detector for detecting the power of light generated as the result of four-wave mixing generated in the optical fiber transmission line by the interaction of the WDM signal light and the reference light; and means for controlling the power of the WDM signal light to be supplied to the optical fiber transmission line according to the power detected.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Some preferred embodiments of the present invention will now be described in detail with reference to the drawings.

Figure 1:
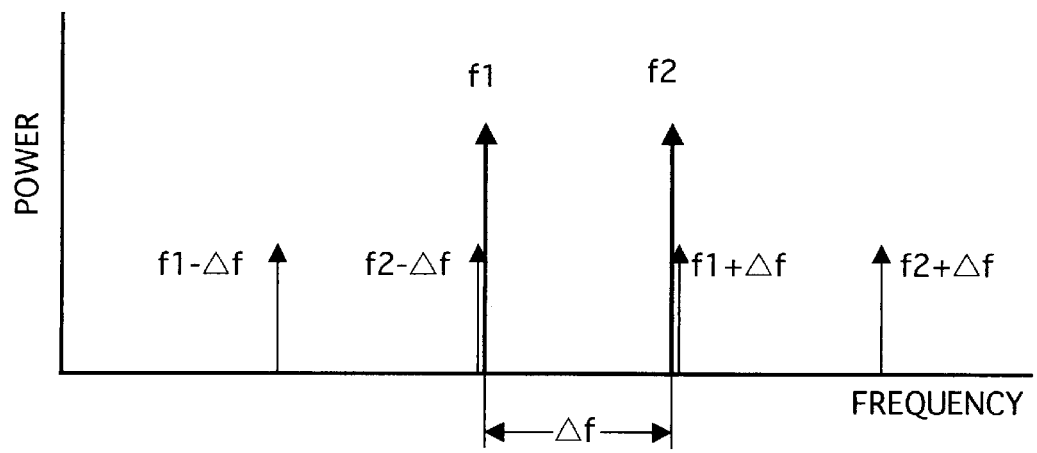
FIG. 1 is a diagram for illustrating the generation of four-wave mixing in the case of two optical signals.

There will first be described four-wave mixing in the case of two optical signals with reference to FIG. 1. In the case that four-wave mixing is generated by an optical signal having a frequency f1 and an optical signal having a frequency f2, light having frequencies shifted from the frequencies f1 and f2 of these optical signals by a difference frequency $\Delta f$ is newly generated. When light having different frequencies propagates in an optical fiber, beat (oscillation) having a frequency corresponding to the difference between these frequencies is generated to oscillate the optical fiber. The oscillation of the optical fiber modulates the propagated light to generate modulated sidebands on both sides of the frequencies of the propagated light.

The light newly generated for the optical signal having the frequency f1 is composed of light having a frequency (f1−$\Delta f$) and light having a frequency (f1+$\Delta f$). The light newly generated for the optical signal having the frequency f2 is composed of light having a frequency (f2+$\Delta f$) and light having a frequency (f2−$\Delta f$).

The light having the frequency (f1−$\Delta f$) and the light having the frequency (f2+$\Delta f$) are relatively largely shifted in frequency from the respective original optical signals, so that they are hardly influenced. However, the light having the frequency (f2−$\Delta f$) and the light having the frequency (f1+$\Delta f$) are generated in the bands of the optical signals having the frequencies f1 and f2, respectively, so that these optical signals are degraded in characteristic. Further, in the case that other signals are present near the frequency (f2+$\Delta f$) and the frequency (f1−$\Delta f$), it is understood that these signals are also degraded in characteristic.

Figure 2:
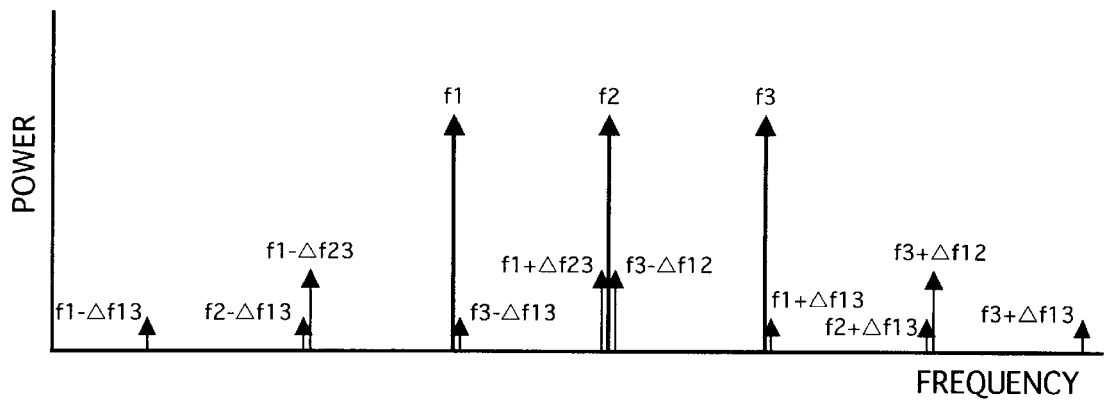
FIG. 2 is a diagram for illustrating the generation of four-wave mixing in the case of three optical signals.

Referring to FIG. 2, there is shown a condition where four-wave mixing is generated by three optical signals. In this case, the three optical signals have different frequencies f1, f2, and f3, and the difference between the frequencies f1 and f2 is denoted by $\Delta f12$, the difference between the frequencies f1 and f3 is denoted by $\Delta f13$, and the difference between the frequencies f2 and f3 is denoted by $\Delta f23$.

As in the previous case that four-wave mixing is generated by two optical signals, the oscillation at a frequency corresponding to the difference between the frequencies of the optical signals modulates these optical signals or other signals to generate modulated sidebands on both sides of the frequencies of the propagated light. In FIG. 2, the vertical axis represents optical output power.

The generation efficiency of four-wave mixing effects increases with an increase in input power per channel, a decrease in channel spacing, and a decrease in fiber dispersion. Accordingly, in the case that the three optical signals have the same level, the power of light at the frequency f12 or f23 is larger than that at the frequency f13.

Consider the case where three waves having angular frequencies $\omega i$, $\omega j$, and $\omega k$ (j≠k) enter an optical fiber to generate a new wave having an angular frequency $\omega ijk=\omega i+\omega j-\omega k$.

The power Pijk (L) of the new wave at the angular frequency $\omega ijk$ obtained after propagation in an optical fiber having a length L is given by the following expression using a cgs/esu system of units.

$$Pijk(L)=\eta(1024\pi^6/n^4\lambda^2c^2)(D\lambda xxxx)^2(Leff/Aeff)^2 \times PiPjPk\ exp(-\alpha L)$$

where $\eta$ is the efficiency of four-wave mixing, n is the refractive index, $\lambda$ is the wavelength, c is the speed of light, D is the degenerate factor, which takes a value of 1 when the three frequencies are equal to each other, takes a value of 3 when any two of the three frequencies are equal to each other, and takes a value of 6 when the three frequencies are different from each other, $\lambda xxxx$ is the susceptibility of third-order nonlinear polarization, Leff is the effective length of the optical fiber exhibiting nonlinear interaction, Aeff is the effective core area exhibiting nonlinear interaction, Pi, Pj, and Pk are the powers of the three waves entering the optical fiber, and $\alpha$ is the attenuation constant of the optical fiber.

It is understood from the above expression that the larger the power, the larger the four-wave mixing effect. Accordingly, by setting the power of reference light larger than the power of main signal light, light generated by scattering of the reference light due to the difference frequency of the main signal light becomes larger than light generated by scattering of the main signal light. As a result, the main signal light is not affected by a possible four-wave mixing effect generated by the reference light. By detecting the light generated by the reference light, the output of the main signal light can be increased in the condition where the four-wave mixing effect is generated in a transmission line or just before generation of the four-wave mixing effect.

Figure 3:
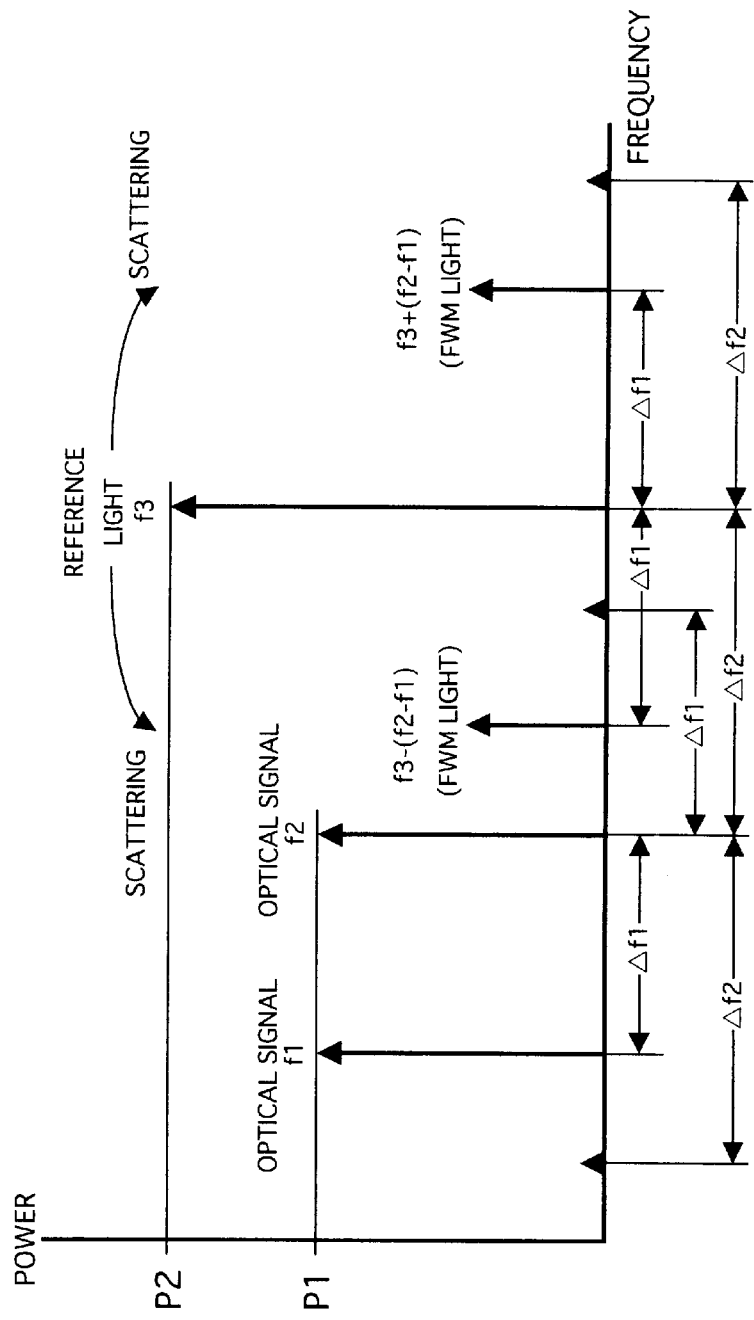
FIG. 3 is a diagram for illustrating the generation of four-wave mixing in the case of two optical signals and reference light.

The generation of four-wave mixing in the case of two optical signals and reference light will now be described with reference to FIG. 3.

First, the four-wave mixing effect will be described.

When light having different frequencies propagates in an optical fiber, beat having a difference frequency is generated to oscillate the material state of the optical fiber. The oscillation of the fiber material state has an effect on the propagated light to cause scattering of a part of the propagated light. This scattered light also propagates in the optical fiber. The frequency of the scattered light is shifted from the frequency of the original propagated light by the frequency of the oscillation of the fiber material state.

The frequency of the oscillation of the fiber material state is the same as the frequency of the beat, or the difference frequency in WDM signal light. Therefore, the frequency of the scattered light is equal to (the frequency of the propagated light)±(the difference frequency). Thus, the two waves at different frequencies causing the beat and the scattered wave from the propagated light produce a new, or fourth wave at another frequency. This is referred to as a four-wave mixing effect.

The condition of two optical signals having different frequencies f1 and f2 and reference light having a frequency f3 will now be described.

It is essential that the output of the reference light is larger than that of each optical signal. The power of each optical signal is shown by P1, and the power of the reference light is shown by P2. The four-wave mixing effect is a nonlinear phenomenon occurring more remarkably with an increase in optical output power (with an increase in power per channel). Accordingly, by setting the power P2 of the reference light larger than the power P1 of each optical signal, four-wave mixing by the reference light and each optical signal can be generated prior to generation of four-wave mixing by the two optical signals.

The light generated by the reference light as the result of four-wave mixing is composed of light having a frequency f3−(f2−f1) and light having a frequency f3+(f2−f1). The frequency f3−(f2−f1) and the frequency f3+(f2−f1) do not fall within the band of each optical signal, but fall on both sides of the frequency of the reference light. Accordingly, there is no degradation in characteristic of the main signals. Further, since the power of each optical signal is lower than the power of the reference light, light caused by the four-wave mixing effect on the two optical signals is not generated at this time. Even if this light is generated, it is smaller than the light generated by the reference light. Similarly, light caused by the four-wave mixing effect on the reference light and each optical Signal is not generated because the difference in frequency therebetween is large. Even if this light is generated, it is smaller than the light generated by the reference light.

The light generated by the reference light as the result of four-wave mixing is spaced in frequency from each optical signal, so that this light can be easily detected by using a filter or the like.

Figure 4:
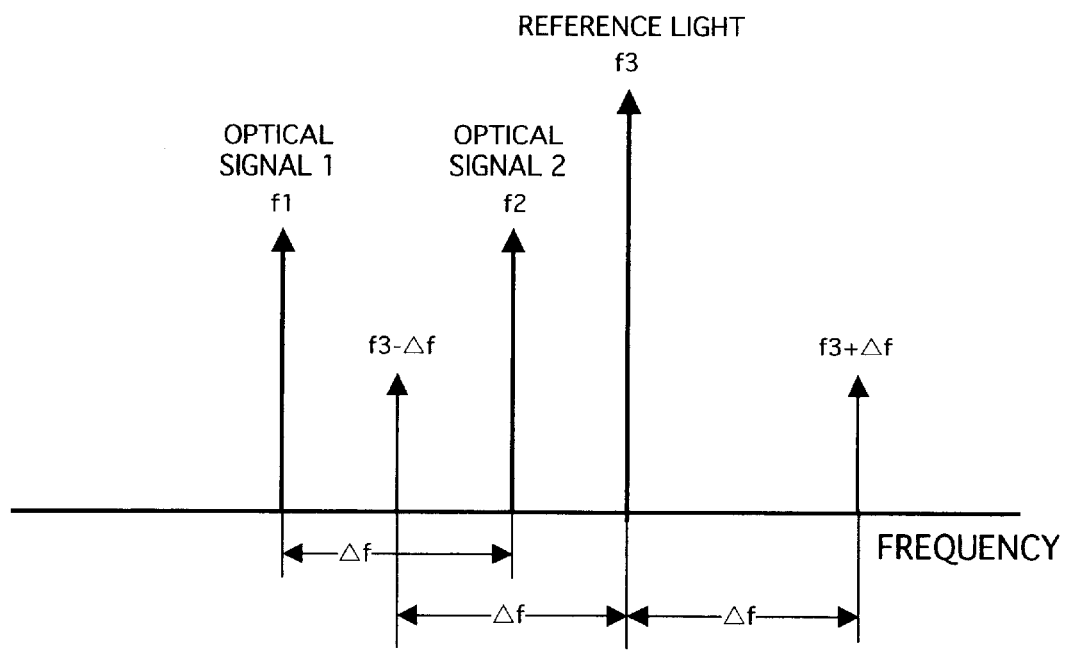
FIG. 4 is a diagram for illustrating an example of frequency setting of the reference light.

FIG. 4 shows an example of setting of the frequency of the reference light.

In the case of setting the frequency of the reference light to f2+Δf/2=f3 where Δf is the difference between the frequencies f1 and f2 of the two optical signals, the frequencies of light generated by four-wave mixing are (f3−Δf) and (f3+Δf). The frequency (f3−Δf) falls at the intermediate of the frequencies f1 and f2, so that both the optical signals are not affected by the light generated by four-wave mixing. Also in the case that the number of optical signals is increased, light generated by four-wave mixing is present between the optical signals, so that there is no degradation in characteristic of the optical signals.

Figure 5:
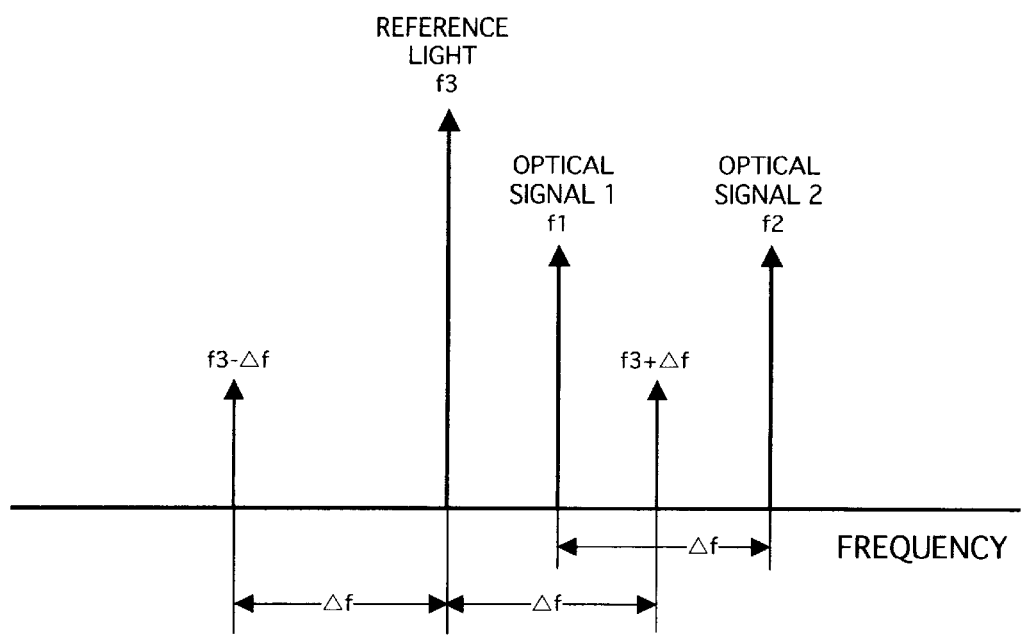
FIG. 5 is a diagram for illustrating another example of frequency setting of the reference light.

FIG. 5 shows another example of setting of the frequency of the reference light. In this example, the frequency f3 of the reference light is set lower than the frequency f1 of the optical signal. Also in this case, a similar effect is obtained.

The method and device for optical fiber transmission according to the present invention will now be described more specifically with reference to FIG. 6. WDM signal light obtained by wavelength division multiplexing a plurality of optical signals having different wavelengths $\lambda_1$ to $\lambda_n$ (n is an integer greater than 1) is supplied through a multiplexer 2 such as an optical multiplexer to an optical amplifier 4. The optical amplifier 4 is an EDFA (erbium doped fiber amplifier), for example. Further, reference light having a predetermined wavelength is also supplied through the multiplexer 2 to the optical amplifier 4.

The WDM signal light and the reference light both amplified by the optical amplifier 4 are supplied to an optical fiber transmission line 6 and transmitted by the optical fiber transmission line 6 to a receiving side.

In the optical fiber transmission line 6, four-wave mixing is generated by the interaction of the WDM signal light and the reference light, resulting in the generation of new light. This new light is extracted by a demultiplexer 8 on the receiving side, and the power of this new light extracted is detected by a power detector 10. Then, the power of the WDM signal light to be supplied to the optical fiber transmission line 6 is controlled according to the power detected by the power detector 10.

Figure 6:
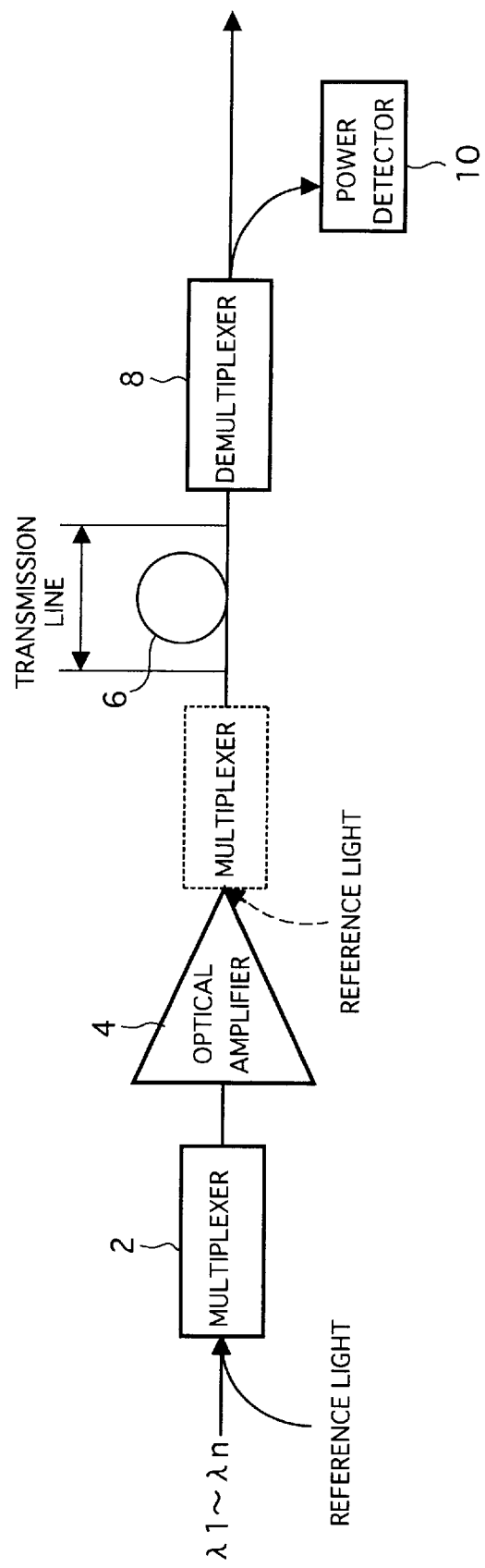
FIG. 6 is a block diagram for specifically illustrating the method and device according to the present invention.

While the multiplexer 2 is provided upstream of the optical amplifier 4 as shown in FIG. 6, the multiplexer 2 may be provided downstream of the optical amplifier 4, that is, between the optical amplifier 4 and the optical fiber transmission line 6.

In the present invention, it is preferable to generate four-wave mixing between the reference light and the optical signal of at least one channel of the WDM signal light prior to generation of four-wave mixing between the optical signals of two or more channels of the WDM signal light. Accordingly, there is an assumable case that reference light having a power sufficiently larger than that of each optical signal becomes necessary. In such a case, the provision of the multiplexer 2 upstream of the optical amplifier 4 is effective.

By contrast, in the case that the multiplexer 2 is provided downstream of the optical amplifier 4, a degradation in NF (noise figure) of the optical amplifier 4 can be suppressed by an amount corresponding to the loss induced by the provision of the multiplexer 2 upstream of the optical amplifier 4.

Figure 7A:
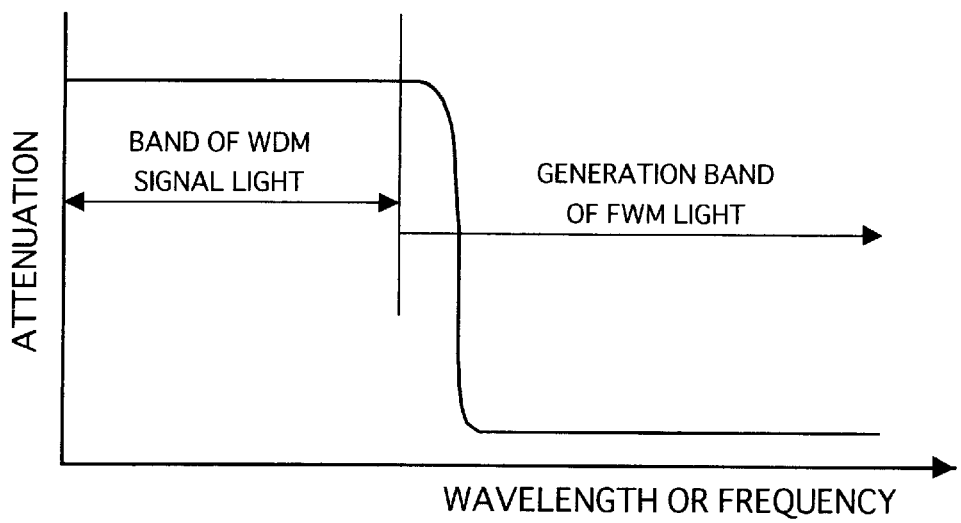
FIGS. 7A and 7B are graphs for illustrating examples of the characteristic of an optical filter usable in the present invention.
Figure 7B:
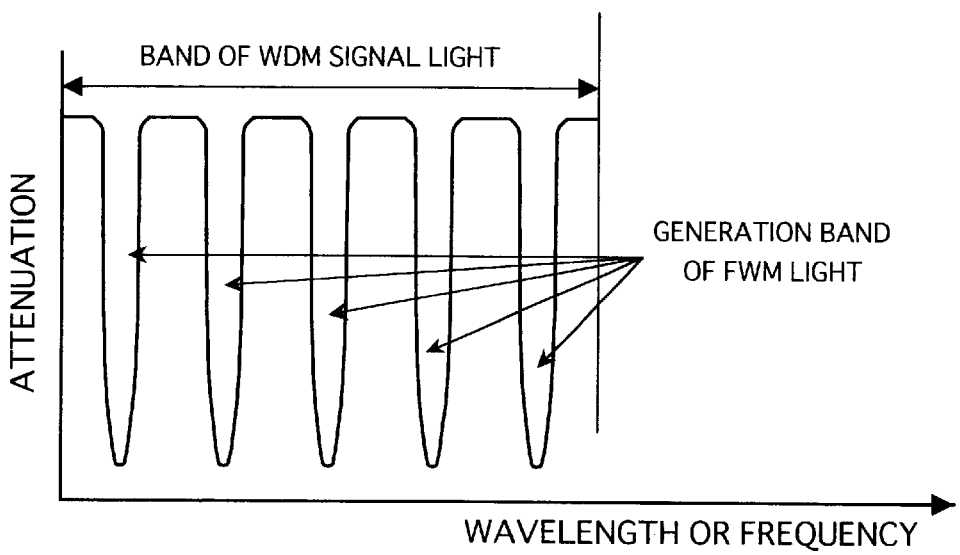

FIGS. 7A and 7B show examples of the characteristic of an optical filter usable as a part or the whole of the demultiplexer 8. In each of FIGS. 7A and 7B, the vertical axis represents attenuation between an input port of the demultiplexer 8 and an output port thereof connected to the power detector 10, and the horizontal axis represents wavelength or frequency.

In this specification, the band of the WDM signal light is sufficiently narrow with respect to its central wavelength (e.g., 1.55 μm), and the relation between wavelength and frequency in this narrow band is substantially linear. In consideration of this fact, the terms of wavelength and frequency are used in the same sense.

In the example shown in FIG. 7A, the wavelength of the reference light is set outside of the band of the WDM signal light, and in the case that light induced by four-wave mixing is generated, the wavelength of this light does not fall within the band of the WDM signal light. Accordingly, the characteristic of the optical filter adopted is such that the attenuation is sufficiently large in the band of the WDM signal light.

In the example shown in FIG. 7B, the wavelength of the reference light is set to the sum of a longest wavelength in the band of the WDM signal light and ½ of each channel spacing in the WDM signal light. In this example, the channel spacings are equal to each other. In this case, by adopting an optical filter having a periodicity corresponding to ½ of each channel spacing, light generated by four-wave mixing can be effectively extracted.

Figure 8:
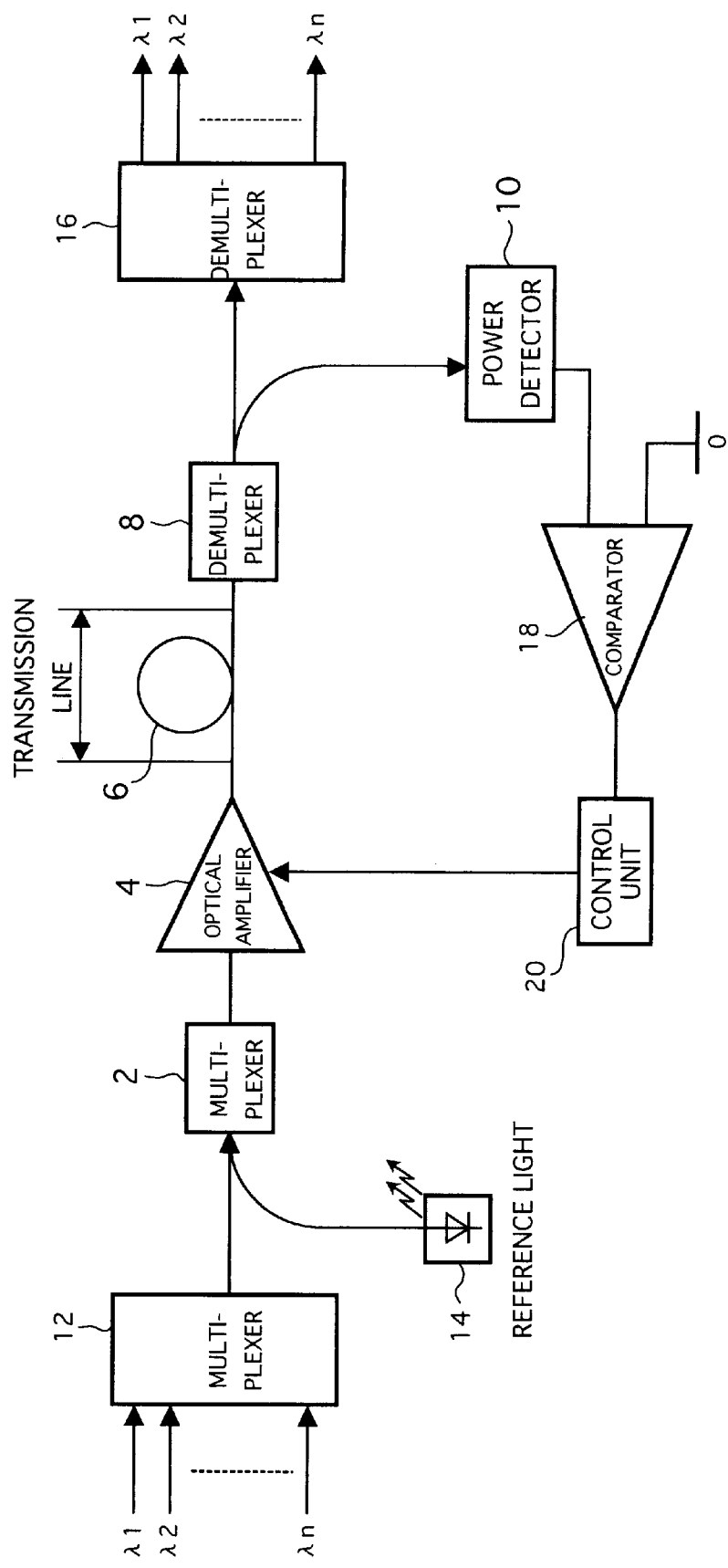
FIG. 8 is a block diagram for illustrating a first preferred embodiment of the device according to the present invention.

Referring to FIG. 8, there is shown a first preferred embodiment of the device according to the present invention. A multiplexer 12 is used to obtain WDM signal light by wavelength division multiplexing optical signals having different wavelengths $\lambda_1$ to $\lambda_n$. The WDM signal light output from the multiplexer 12 and reference light output from a reference light source 14 such as a laser diode are supplied to the multiplexer 2.

The demultiplexer 8 has one input port and two output ports. One of the two output ports of the demultiplexer 8 is connected to the power detector 10, and the other output port is connected to a demultiplexer 16 such as an optical demultiplexer. The demultiplexer 16 separates the WDM signal light transmitted by the optical fiber transmission line 6 and supplied through the demultiplexer 8 into the individual optical signals.

A comparator 18 and a control unit 20 are used to feed back an output from the power detector 10 to the gain of the optical amplifier 4, for example. The comparator 18 compares the output level from the power detector 10 with a reference level (zero bolt in this case), and outputs an error signal therebetween. The control unit 20 controls the gain of the optical amplifier 4 so that the error signal supplied from the comparator 18 becomes zero or constant, for example.

In the case of controlling the gain of the optical amplifier 4, the power of pump light in an EDFA may be adopted as a subject of control in the optical amplifier 4. Further, in the case that the optical amplifier 4 includes two cascaded EDFAs, the attenuation of an optical variable attenuator possibly provided between these EDFAs may be controlled.

By controlling the gain of the optical amplifier 4 so that the error signal from the comparator 18 becomes zero, the generation of four-wave mixing in the optical fiber transmission line 6 can be prevented to thereby minimize the degradation of the optical signals.

In the case that the optical amplifier 4 adopts ALC (automatic output level control), the generation efficiency of four-wave mixing varies with variations in input level. Accordingly, by controlling the gain of the optical amplifier 4 as shown in FIG. 8 in this case, an adverse effect of four-wave mixing can be efficiently prevented.

In the case that the optical amplifier 4 adopts AGC (automatic gain control), the generation efficiency of four-wave mixing also varies with variations in input level if the gain is constant. Accordingly, in this case, the gain of the optical amplifier 4 is preferably controlled according to a signal or the like from the control unit 20 so that the variations in input level are canceled.

Figure 9:
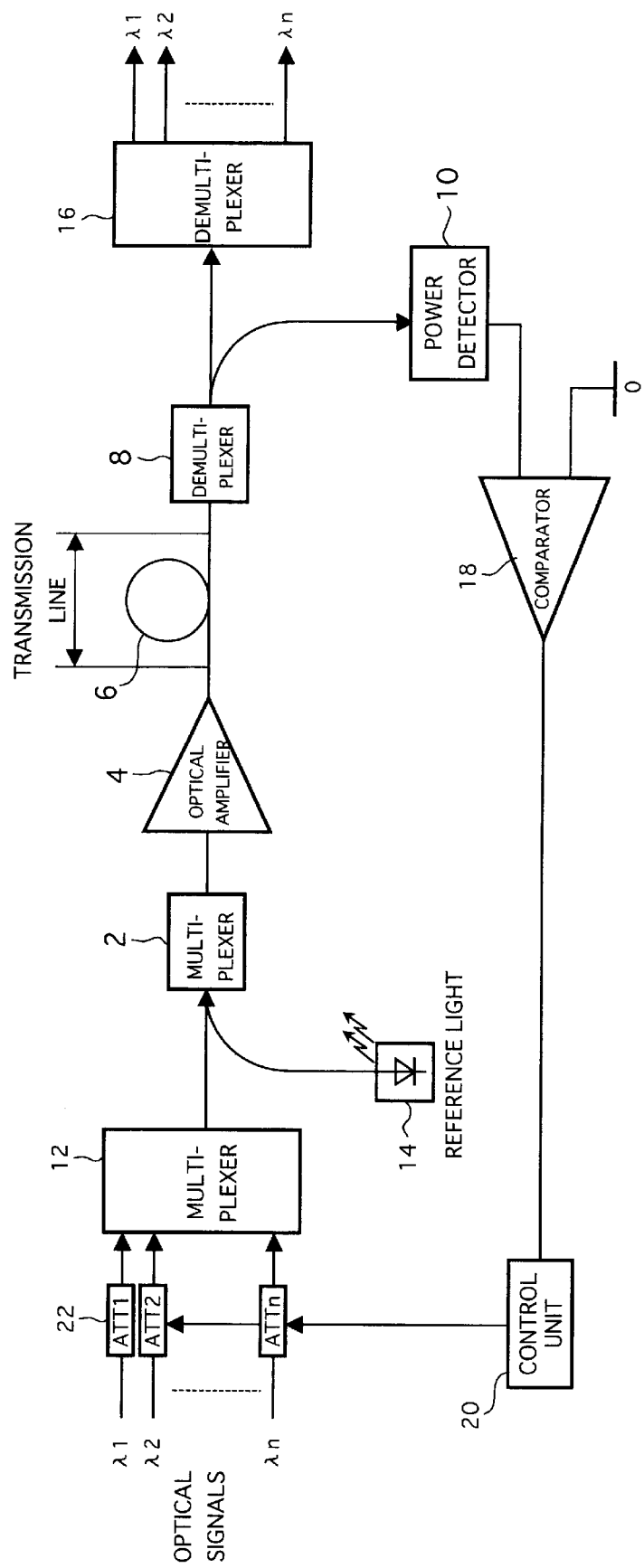
FIG. 9 is a block diagram for illustrating a second preferred embodiment of the device according to the present invention.

FIG. 9 shows a second preferred embodiment of the device according to the present invention. In this preferred embodiment, a variable optical attenuator 22 is additionally provided at each input port of the multiplexer 12, and the attenuation of each variable optical attenuator 22 is controlled by a signal from the control unit 20.

Also in this preferred embodiment, the generation of four-wave mixing in the optical fiber transmission line 6 can be prevented to minimize the degradation of the optical signals.

Figure 10:
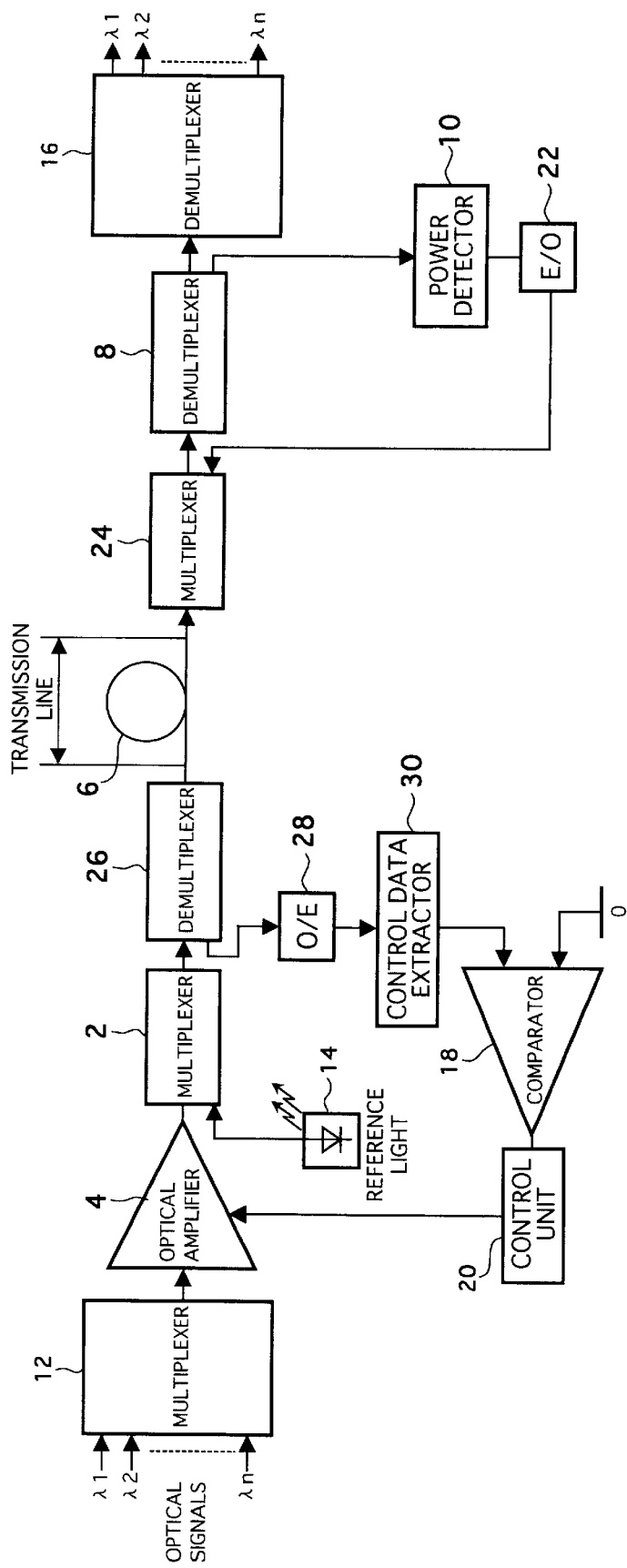
FIG. 10 is a block diagram for illustrating a third preferred embodiment of the device according to the present invention.

FIG. 10 shows a third preferred embodiment of the device according to the present invention. This preferred embodiment includes a modification for feeding back the power detected by the power detector 10 to the transmitting side. This modification will now be described more specifically.

On the receiving side, an E/O (electro/optical) converter 22 generates a supervisory optical signal according to the power detected by the power detector 10, and supplies this supervisory optical signal to a multiplexer 24. The multiplexer 24 is provided between the optical fiber transmission line 6 and the demultiplexer 8, and functions to supply the supervisory optical signal to the optical fiber transmission line 6 in a direction opposite to the propagation direction of the WDM signal light.

On the transmitting side, the arrangement of the optical amplifier 4 and the multiplexer 2 is reverse to that shown in FIG. 8, and a demultiplexer 26 is additionally provided between the multiplexer 2 and the optical fiber transmission line 6 in contrast to the preferred embodiment shown in FIG. 8. The demultiplexer 26 extracts the supervisory optical signal transmitted from the receiving side. The supervisory optical signal extracted by the demultiplexer 26 is converted into an electrical signal by an O/E (opto/electrical) converter 28, and this electrical signal is supplied to a control data extracting circuit 30. Data obtained in the control data extracting circuit 30 corresponds to the output from the power detector 10 on the receiving side. Accordingly, by inputting this data into the comparator 18, control similar to that in the preferred embodiment shown in FIG. 8 can be performed.

Figure 11:
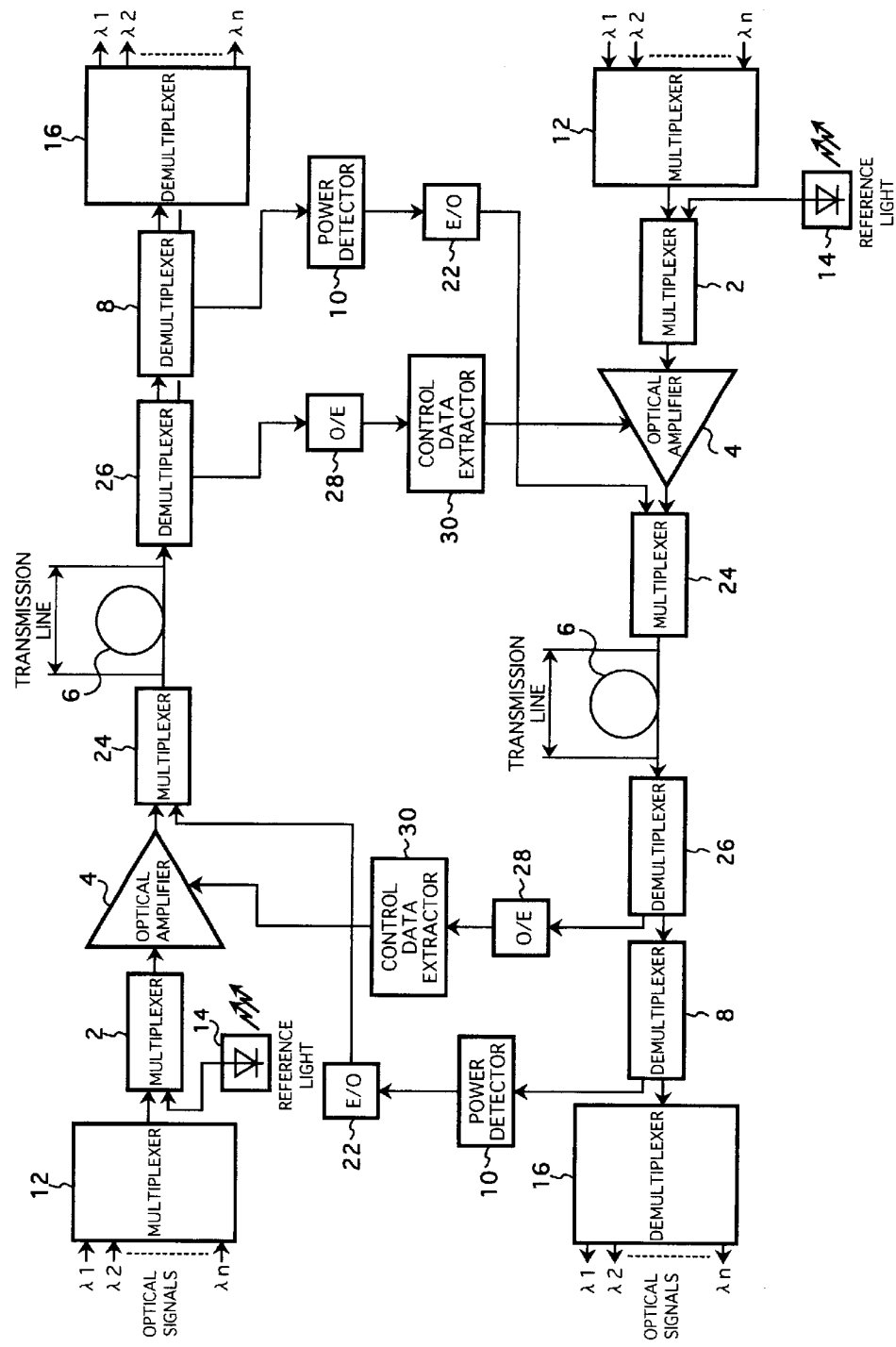
FIG. 11 is a block diagram for illustrating a fourth preferred embodiment of the device according to the present invention.

FIG. 11 shows a fourth preferred embodiment of the device according to the present invention. This preferred embodiment includes another modification for feeding back the power detected by the power detector 10 to the transmitting side. This modification will now be described more specifically.

Two optical fiber transmission lines 6 for bidirectional transmission, or upstream transmission and downstream transmission are provided. For example, two sets of devices (systems) each shown in FIG. 10 are used, and the upstream optical fiber transmission line 6 different from the downstream optical fiber transmission line 6 subjected to measurement on four-wave mixing is used to feed back the power detected by the power detector 10 on the receiving side to the transmitting side.

To this end, the supervisory optical signal from the E/O converter 22 on the receiving side is supplied to a multiplexer 24 provided upstream of the upstream optical fiber transmission line 6. Further, the supervisory optical signal transmitted by the upstream optical fiber transmission line 6 is extracted by a demultiplexer 26 provided downstream of the upstream optical fiber transmission line 6. This supervisory optical signal extracted is used on the transmitting side to be fed back of the downstream optical fiber transmission line 6 subjected to measurement on four-wave mixing.

Also in this preferred embodiment, the generation of four-wave mixing in each optical fiber transmission line 6 can be prevented to minimize the degradation of the optical signals.

Figure 12:
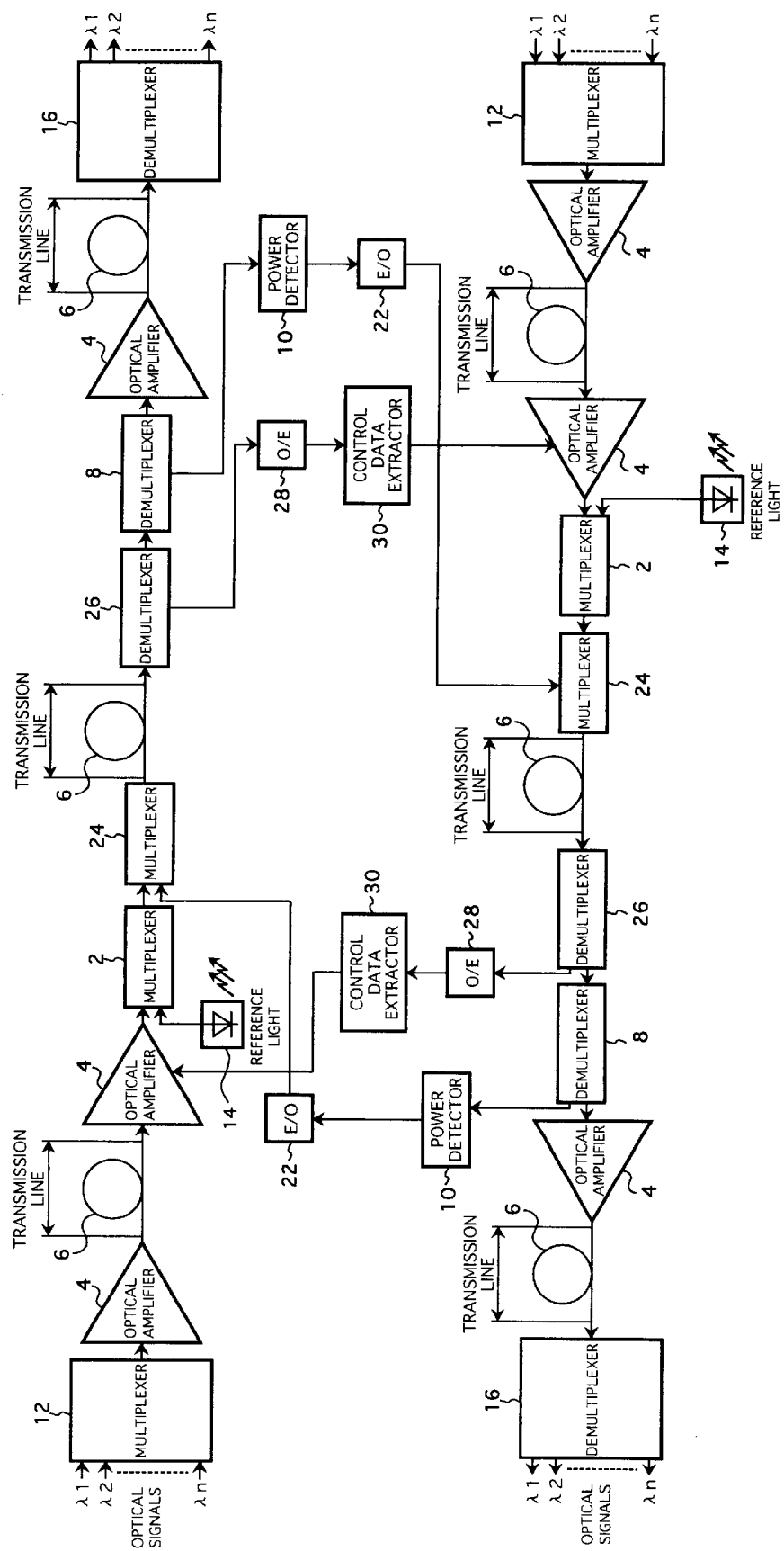
FIG. 12 is a block diagram for illustrating a fifth preferred embodiment of the device according to the present invention.

FIG. 12 shows a fifth preferred embodiment of the device according to the present invention. In contrast to the preferred embodiment shown in FIG. 11, the preferred embodiment shown in FIG. 12 is characterized in that linear repeaters are used to compensate for losses in each optical fiber transmission line 6. More specifically, two linear repeaters are arranged along each optical fiber transmission line 6, and the transmission of a supervisory optical signal and the control thereby as in the preferred embodiment shown in FIG. 11 are performed among the totally four linear repeaters.

Also in this preferred embodiment, the generation of four-wave mixing in each optical fiber transmission line 6 can be prevented to minimize the degradation of the optical signals.

While continuous-wave light (CW light or DC light) may be used as the reference light in each preferred embodiment mentioned above, the reference light may be modulated according to an appropriate signal.

There will now be proved that the wavelengths of light (FWM light) generated by reference light ($\lambda s$) are different from the signal wavelengths ($\lambda_1$ to $\lambda_n$) in operation under the following conditions.

(1) The wavelength ($\lambda s$) of the reference light is longer or shorter than the signal wavelengths (i.e., falls outside the band of the signal wavelengths), and is shifted from the band by ½ of the wavelength spacing of the signal wavelengths.

(2) The signal wavelengths are equally spaced (i.e., the wavelength spacing $\Delta\lambda$).

(3) The wavelengths of FWM light: $Wijk=Wi+Wj-Wk$ ($j \neq k$, $i \neq k$)

1. Generation of $\lambda ssi$ $$\lambda ssi = \lambda s + \lambda s - \lambda i$$

$$\lambda s - \lambda i = (i+0.5) \times \Delta\lambda$$

Accordingly, $$\lambda ssi = \lambda s + (i+0.5) \times \Delta\lambda$$

Since $\lambda s$ falls at $1.5 \times \Delta\lambda$, $\lambda ssi$ generated falls in the grid (signal wavelength spacing). $\lambda ssi$ is generated on the right side only of the signal wavelength $\lambda i$, so that the FWM light having $\lambda ssi$ has no effect on the signal.

2. Generation of $\lambda sij$ $$\lambda sij = \lambda s + \lambda i - \lambda j$$

$$\lambda sij = \lambda s \pm n \times \Delta\lambda$$

$i>j$; $\lambda sij = \lambda s + n \times \Delta\lambda$ $i<j$; $\lambda sij = \lambda s - n \times \Delta\lambda$ In the case of $i>j$, $\lambda sij$ is generated on the right side of $\lambda s$, so that the FWM light having $\lambda sij$ has no effect on the signals.

In the case of $i<j$, $\lambda sij$ is generated on the left side of $\lambda s$. However, since $\lambda s$ falls at $1.5 \times \Delta\lambda$, $\lambda sij$ is generated not in the signal grid, but intermediate of the signals, so that the FWM light having $\lambda sij$ has no effect on the signals.

3. Generation of $\lambda iis$ $$\lambda iis = \lambda i + \lambda i - \lambda s$$

$$\lambda i - \lambda s = -(n+0.5) \times \Delta\lambda$$

Accordingly, $$\lambda iis = \lambda i - (n+0.5) \times \Delta\lambda$$

$\lambda iis$ is generated on the left side of $\lambda s$. However, since $\lambda s$ falls at $1.5 \times \Delta\lambda$, $\lambda iis$ is generated not in the signal grid, but intermediate of the signals, so that the FWM light having $\lambda iis$ has no effect on the signals.

4. Generation of $\lambda isj$ $$\lambda isj = \lambda i + \lambda s - \lambda j$$

$$\lambda s - \lambda j = (n+0.5) \times \Delta\lambda$$

Accordingly, $$\lambda isj = \lambda i + (n+0.5) \times \Delta\lambda$$

In the case of $j<i<s$, $\lambda isj$ is generated on the right side of $\lambda s$. However, since $\lambda isj$ falls outside the band of the signal wavelengths, the FWM light having $\lambda isj$ has no effect on the signals.

In the case of $i<j<s$, $\lambda isj$ is generated on the left side of $\lambda s$. However, since $\lambda s$ falls at $(n+0.5) \times \Delta\lambda$, $\lambda isj$ is generated at the intermediate of the signal grid, so that the FWM light having $\lambda isj$ has no effect on the signals.

5. Generation of $\lambda ijs$ $$\lambda ijs = \lambda i + \lambda j - \lambda s$$

$$\lambda j - \lambda s = -(n+0.5) \times \Delta\lambda$$

Accordingly, $$\lambda ijs = \lambda i (n+0.5) \times \Delta\lambda$$

$\lambda ijs$ is generated in the signal band. However, since $\lambda s$ falls at $(n+0.5) \times \Delta\lambda$, $\lambda ijs$ is generated at the intermediate of the signal grid, so that the FWM light having $\lambda ijs$ has no effect on the signals.

It is understood from the above description that by setting $\lambda s$ to a wavelength falling outside the signal band and in the signal grid, the FWM light is generated outside the signal band. Even if the FWM light is generated inside the signal band, it is generated at the intermediate of the signal grid, thus exhibiting no effect on the signals.

Also in the case that &Ks is longer or shorter than the signal wavelengths, the wavelengths of the FWM light generated becomes different from the signal wavelengths.

In the case that $\lambda s$ falls within the signal band and in the signal grid, $\lambda ssi$ becomes coincident with the signal wavelength. Therefore, $\lambda s$ must be set to a wavelength falling outside the signal band.

The power of the FWM light generated by the reference light will now be described.

Assuming that the wavelength dependence is small in the above-mentioned expression, only the degenerate factor D will now be considered. In the case that the three frequencies are equal to each other, $D=1$. In the case that any two of the three frequencies are equal to each other, $D=3$. In the case that all of the frequencies are different from each other, $D=6$.

(1) Calculation of the power of FWM light generated in the case that the signal light is eight waves ($\lambda_1$ to $\lambda_8$).

Of the FWM light generated at the wavelength &K4, there are four patterns of $\lambda_{1,5,2}$, $\lambda_{1,6,3}$, $\lambda_{1,7,4}$, and $\lambda_{1,8,5}$ using $\lambda_1$ as a basic wavelength.

As the wavelengths using $\lambda_2$ as a basic wavelength, there are five patterns of $\lambda_{2,3,1}$, $\lambda_{2,5,3}$, $\lambda_{2,6,4}$, $\lambda_{2,7,5}$, and $\lambda_{2,8,6}$.

As the wavelengths using $\lambda_3$ as a basic wavelength, there are six patterns of $\lambda_{3,2,1}$, $\lambda_{3,3,2}$ (degenerate), $\lambda_{3,5,4}$, $\lambda_{3,6,5}$, $\lambda_{3,7,6}$, and $\lambda_{3,8,7}$.

As the wavelengths using $\lambda_5$ as a basic wavelength, there are six patterns of $\lambda_{5,1,2}$, $\lambda_{5,2,3}$, $\lambda_{5,3,4}$, $\lambda_{5,5,6}$ (degenerate), $\lambda_{5,6,7}$, and $\lambda_{5,7,8}$.

As the wavelengths using $\lambda_6$ as a basic wavelength, there are five patterns of $\lambda_{6,1,3}$, $\Delta_{6,2,4}$, $\lambda_{6,3,5}$, $\lambda_{6,5,7}$, and $\lambda_{6,6,8}$ (degenerate).

As the wavelengths using $\lambda_7$ as a basic wavelength, there are four patterns of $\lambda_{7,1,4}$, $\lambda_{7,2,5}$, $\lambda_{7,3,6}$, and $\lambda_{7,5,8}$.

As the wavelengths using $\lambda_8$ as a basic wavelength, there are three patterns of $\lambda_{8,1,5}$, $\lambda_{8,2,6}$, and $\lambda_{8,3,7}$.

The number of degenerate ($\lambda$x,x,m) patterns is calculated as follows:

$$x+(x-m)=4, m=1 \text{ to } 8, x=2+m/2.$$

Accordingly, x=3, 4, 5, 6. That is, there are four patterns of $\lambda_{3,3,2}$, $\lambda_{4,4,4}$, $\lambda_{5,5,6}$, and $\lambda_{6,6,8}$. Actually, $\lambda_{4,4,4}$ is not generated.

The number of nondegenerate patterns is calculated as $[(3+6)\times2\times2-3]-4=29$.

In consideration of the degenerate factor D, the number of degenerate patterns is multiplied by 1, and the number of nondegenerate patterns is multiplied by 4. That is, as shown in the above-mentioned expression for calculation of the power Pijk of FWM light, the degenerate factor D is a square coefficient. Accordingly, the power relation between degenerate case and nondegenerate case is 1:4. As a result, the total power of the FWM light generated at $\lambda_4$ is calculated as $29\times4+4\times1=120$.

Of the FWM light generated at the wavelength &K1, there are six patterns of $\lambda_{2,2,3}$ (degenerate), $\lambda_{2,3,4}$, $\lambda_{2,4,5}$, $\lambda_{2,5,6}$, $\lambda_{2,6,7}$, and $\lambda_{2,7,8}$ using $\lambda_2$ as a basic wavelength.

As the wavelengths using $\lambda_3$ as a basic wavelength, there are five patterns of $\lambda_{3,2,4}$, $\lambda_{3,3,5}$ (degenerate), $\lambda_{3,4,6}$, $\lambda_{3,5,7}$, and $\lambda_{3,6,8}$.

As the wavelengths using $\lambda_4$ as a basic wavelength, there are four patterns of $\lambda_{4,2,5}$, $\lambda_{4,3,6}$, $\lambda_{4,4,7}$ (degenerate), and $\lambda_{4,5,8}$.

As the wavelengths using $\lambda_5$ as a basic wavelength, there are three patterns of $\lambda_{5,2,6}$, $\lambda_{5,3,7}$, and $\lambda_{5,4,8}$.

As the wavelengths using $\lambda_6$ as a basic wavelength, there are two patterns of $\lambda_{6,2,7}$ and $\lambda_{6,3,8}$.

As the wavelengths using $\lambda_7$ as a basic wavelength, there is only one pattern of $\lambda_{7,2,8}$.

The number of degenerate ($\lambda$x,x,m) patterns is calculated as follows:

$$x+(x-m)=1, m=1 \text{ to } 8, x=(1+m)/2.$$

Accordingly, x=1, 2, 3, 4. That is, there are four patterns of $\lambda_{1,1,1}$, $\lambda_{2,2,3}$, $\lambda_{3,3,5}$, and $\lambda_{4,4,7}$. Actually, $\lambda_{1,1,1}$ is not generated.

The number of nondegenerate patterns is calculated as $1+2+3+4+5+6=21$.

As a result, the total power of the FWM light generated at $\lambda_1$ is calculated as $21\times4+4\times1=88$.

In summary, it is understood that the power of the FWM light generated at $\lambda_4$ is larger than the power of the FWM light generated at $\lambda_1$.

(2) Calculation of the power of FWM light generated at a (n/2)-th channel providing a large amount of FWM, in the case that the number of channels is n.

The relation between the number of patterns of FWM light and the wavelength is as follows:

$\lambda_0$ ... $(n/2)-1$ $\lambda_1$ ... $n/2$ $\vdots$ $\lambda_{(n/2)-1}$ ... $n-2$ $\lambda_{n/2}$ ... none $\lambda_{(n/2)+1}$ ... $n-2$ $\vdots$ $\lambda_{n-1}$ ... $n/2$ $\lambda_n$ ... $(n/2)-1$ The number of nondegenerate patterns in the FWM light generated is as follows:

$$\left\{(n-2)+\left(\frac{n}{2}-1\right)\right\}\frac{n}{2}\cdot\frac{1}{2}\times2-\left(\frac{n}{2}-1\right)-\frac{n}{2}=\left(\frac{3}{2}n-3\right)\cdot\frac{n}{2}-n+1$$

The number of degenerate patterns in the FWM light generated is as follows:

$$x+x-m=\frac{n}{2} \quad (m=1 \text{ to } n)$$

$$x=\frac{n}{4}+\frac{m}{2}$$

$$\left(\frac{n}{4}+\frac{n}{2}\right)-\left(\frac{n}{4}+1\right)+1=\frac{n}{2}$$

Accordingly, the total power of the FWM light generated as follows:

$$\frac{n}{2}\times1+\left\{\left(\frac{3}{2}n-3\right)\times\frac{n}{2}-n+1\right\}\times4=\frac{1}{2}(6n^2-19n+8)$$

(3) Calculation of the power of FWM light generated by reference light (monitor light) added to the right side of a signal band.

It is assumed that the power of the reference light ($\lambda$s) is equal to the power of each signal.

1) $\lambda$ssi $$\lambda ssi=\lambda s+\lambda s-\lambda i$$

The number of degenerate patterns is 8+1=9. In the case of n channels, the number of degenerate patterns is (n+1).

2) $\lambda$sij (generated on the right side of $\lambda$s in the case of i>j)

$$\lambda sij=\lambda s+\lambda i-\lambda j$$

| j | i | Number |
|---|---|--------|
| 1 | 2 to 8 | 7 |
| 2 | 3 to 8 | 6 |
| 3 | 4 to 8 | 5 |
| 4 | 5 to 8 | 4 |
| 5 | 6 to 8 | 3 |
| 6 | 7 to 8 | 2 |
| 7 | 8 | 1 |

In the case of n channels, the number of nondegenerate patterns is calculated as:

$$\sum_{i=1}^{n-1} i = (n+1) \times \frac{n}{2} - n = \frac{n}{2}(n-1)$$

3) λisj (generated on the right side of λs in the case of j<i<s)

As similar to the above case 2), the number of nondegenerate patterns is calculated as:

$$\frac{n}{2}(n-1)$$

By combining the above cases 1) to 3), the total power of the FWM light is calculated as:

$$(n+1) \times 1 + \frac{n}{2} \cdot (n-1) \times 2 \times 4 = 4n^2 - 3n + 1$$

In the case of n=8, the total power becomes 233.

According to the present invention as described above, it is possible to provide a method and device for optical fiber transmission which can suppress the effect of four-wave mixing. The effects obtained by the specific preferred embodiments of the present invention have been described above, so the description thereof will be omitted herein.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A method comprising the steps of:
    wavelength division multiplexing a plurality of optical signals having different wavelengths to obtain resultant WDM signal light;
    transmitting said WDM signal light by an optical fiber transmission line;
    supplying reference light having a predetermined wavelength to said optical fiber transmission line;
    generating four-wave mixing in said optical fiber transmission line by the interaction of said WDM signal light and said reference light;
    detecting the power of light generated as the result of said four-wave mixing; and
    controlling the power of said WDM signal light to be supplied to said optical fiber transmission line according to said power detected.

2. A method according to claim 1, wherein said controlling step comprises the step of controlling the power of said WDM signal light to be supplied to said optical fiber transmission line so that said power detected becomes constant.

3. A method according to claim 1, wherein said controlling step comprises the step of controlling the power of said WDM signal light to be supplied to said optical fiber transmission line so that said power detected becomes a minimum valug greater than zero.

4. A method according to claim 1, further comprising the step of setting said predetermined wavelength so that the wavelength of said light generated as the result of said four-wave mixing falls outside the band of said WDM signal light.

5. A method according to claim 1, further comprising the step of providing an optical amplifier for amplifying said WDM signal light to be supplied to said optical fiber transmission line.

6. A method according to claim 5, wherein said reference light is combined with said WDM signal light on the upstream side of said optical amplifier.

7. A method according to claim 5, wherein said reference light is combined with said WDM signal light on the downstream side of said optical amplifier.

8. A method according to claim 1, wherein:
    the wavelength of said reference light falls outside the band of said WDM signal light; and
    the difference between the wavelength of said reference light and the shortest wavelength or longest wavelength in the band of said WDM signal light is smaller than the wavelength spacing of said WDM signal light.

9. A method according to claim 1, further comprising the step of providing an optical filter for extracting said light generated as the result of said four-wave mixing from said WDM signal light transmitted by said optical fiber transmission line.

10. A method according to claim 1, further comprising the step of feeding back said power detected to a transmitting side.

11. A method according to claim 10, wherein said feeding-back step comprises the step of transmitting an optical signal by said optical fiber transmission line in a direction opposite to the propagation direction of said WDM signal light.

12. A method according to claim 10, wherein said feeding-back step comprises the step of transmitting an optical signal by another optical fiber transmission line different from said optical fiber transmission line.

13. A method according to claim 5, wherein said step of providing said optical amplifier comprises the step of controlling the gain of said optical amplifier constant.

14. A method according to claim 13, wherein said controlling step comprises the step of controlling the power of said WDM signal light to be supplied to said optical amplifier.

15. A method according to claim 13, wherein said controlling step comprises the step of controlling the gain of said optical amplifier.

16. A method according to claim 5, wherein said step of providing said optical amplifier comprises the step of controlling the output level of said optical amplifier constant; and
    said controlling step comprises the step of controlling the gain of said optical amplifier.

17. A device comprising:
    an optical fiber transmission line;
    means for supplying WDM signal light obtained by wavelength division multiplexing a plurality of optical signals having different wavelengths, to said optical fiber transmission line;
    a light source for supplying reference light having a predetermined wavelength to said optical fiber transmission line;
    a power detector for detecting the power of light generated as the result of four-wave mixing generated in said optical fiber transmission line by the interaction of said WDM signal light and said reference light; and
    means for controlling the power of said WDM signal light to be supplied to said optical fiber transmission line according to said power detected.

18. A device according to claim 17, wherein said controlling means comprises means for controlling the power of said WDM signal light to be supplied to said optical fiber transmission line so that said power detected becomes constant.

19. A device according to claim 17, wherein said controlling means comprises means for controlling the power of said WDM signal light to be supplied to said optical fiber transmission line so that said power detected becomes a minimum value greater than zero.

20. A device according to claim 17, wherein said predetermined wavelength is set so that the wavelength of said light generated as the result of said four-wave mixing falls outside the band of said WDM signal light.

21. A device according to claim 17, further comprising an optical amplifier for amplifying said WDM signal light to be supplied to said optical fiber transmission line.

22. A device according to claim 21, wherein said reference light is combined with said WDM signal light on the upstream side of said optical amplifier.

23. A device according to claim 21, wherein said reference light is combined with said WDM signal light on the downstream side of said optical amplifier.

24. A device according to claim 17, wherein:
the wavelength of said reference light falls outside the band of said WDM signal light; and
the difference between the wavelength of said reference light and the shortest wavelength or longest wavelength in the band of said WDM signal light is smaller than the wavelength spacing of said WDM signal light.

25. A device according to claim 17, further comprising an optical filter for extracting said light generated as the result of said four-wave mixing from said WDM signal light transmitted by said optical fiber transmission line.

26. A device according to claim 17, further comprising means for feeding back said power detected to a transmitting side.

27. A device according to claim 26, wherein said feeding-back means comprises means for transmitting an optical signal by said optical fiber transmission line in a direction opposite to the propagation direction of said WDM signal light.

28. A device according to claim 26, wherein said feeding-back means comprises means for transmitting an optical signal by another optical fiber transmission line different from said optical fiber transmission line.

29. A device according to claim 21, wherein said optical amplifier comprises means for controlling the gain of said optical amplifier constant.

30. A device according to claim 29, wherein said controlling means comprises means for controlling the power of said WDM signal light to be supplied to said optical amplifier.

31. A device according to claim 29, wherein said controlling means comprises means for controlling the gain of said optical amplifier.

32. A device according to claim 21, wherein:
said optical amplifier comprises means for controlling the output level of said optical amplifier constant; and
said controlling means comprises means for controlling the gain of said optical amplifier.

* * * * *